United States Patent
Phlegm et al.

(10) Patent No.: US 8,679,667 B2
(45) Date of Patent: Mar. 25, 2014

(54) ONE PIECE COMPRESSION RESISTANT PRISMATIC CELL

(75) Inventors: Herman K. Phlegm, Oak Park, MI (US); Pablo Valencia, Jr., Northville, MI (US)

(73) Assignee: GM Global Technology Operations LLC, Detroit, MI (US)

(*) Notice: Subject to any disclaimer, the term of this patent is extended or adjusted under 35 U.S.C. 154(b) by 174 days.

(21) Appl. No.: 12/915,594

(22) Filed: Oct. 29, 2010

(65) Prior Publication Data

US 2012/0107659 A1 May 3, 2012

(51) Int. Cl.
*H01M 2/10* (2006.01)

(52) U.S. Cl.
USPC ............... 429/99; 429/96; 429/98; 429/100; 264/1.1

(58) Field of Classification Search
USPC ....... 429/92–120; 411/360; 277/639; 264/1.1
See application file for complete search history.

(56) References Cited

U.S. PATENT DOCUMENTS

| | | | | | |
|---|---|---|---|---|---|
| 5,512,065 | A | * | 4/1996 | Kump et al. | 29/623.1 |
| 2008/0311379 | A1 | * | 12/2008 | Messenger | 428/319.9 |
| 2009/0261532 | A1 | * | 10/2009 | Morehead | 277/639 |
| 2012/0021271 | A1 | * | 1/2012 | Tople et al. | 429/120 |
| 2012/0121362 | A1 | * | 5/2012 | Taylor et al. | 411/531 |

FOREIGN PATENT DOCUMENTS

CN 101557023 A 10/2009

* cited by examiner

*Primary Examiner* — Milton I Cano
*Assistant Examiner* — Michael Dignan
(74) *Attorney, Agent, or Firm* — Fraser Clemens Martin & Miller LLC; J. Douglas Miller

(57) ABSTRACT

A prismatic repeating frame assembly for a battery pack includes a main body and a hollow compression limiter. The main body is formed from a first polymer. The main body has an aperture formed therein. The hollow compression limiter is formed from a second polymer. The compression limiter is disposed in the aperture of the main body and permits a compression rod to be disposed therethrough. The second polymer is configured to withstand forces during an assembly of the battery pack and frequency inputs during an operation of the battery pack.

16 Claims, 4 Drawing Sheets

ONE PIECE COMPRESSION RESISTANT PRISMATIC CELL

FIELD OF THE INVENTION

The present disclosure relates to a battery pack and more particularly to a battery pack including a prismatic repeating frame assembly.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Battery cells such as lithium-ion battery cells are known to generate heat during operation and as a result of a charge cycle when recharging. When overheated or otherwise exposed to high-temperature environments, undesirable effects can impact the operation of lithium-ion batteries. Cooling systems are typically employed with lithium-ion battery packs to militate against the undesirable overheating conditions. The cooling systems may include cooling plates or fins sandwiched between individual battery cells within the battery pack. The cooling system may have channels through which a coolant flows in a heat transfer relationship with the battery cells.

The battery cells and the cooling systems are often disposed within repeating frame assemblies that form repeating units of the battery pack. The repeating units are stacked and compressed to form the assembled battery pack. It is generally necessary to compress the battery cells and the cooling system within the battery pack in order to form a sufficient seal for delivery of coolant to the cooling system. The battery cells and the cooling system are typically compressed by compression bolts disposed through the repeating frame assemblies of the battery pack.

The repeating frame assemblies are often formed from plastic in order to minimize a mass of the assembled battery pack. However, the plastic materials employed for the frame cannot generally withstand the loads required for assembly and operation of the battery pack. Thus, metallic compression limiters are typically inserted into the repeating frame assemblies for cooperation with the compression bolts. Common compression limiters are formed from either brass or steel. As particular examples, it is known to use 36000 series brass or 1018 series steel. It is also known to use leaded brass. The metallic compression limiters are often installed in the repeating frame assemblies by heat insertion.

The use of compression limiters maintains a structural integrity of the repeating frame assemblies during the operation of the battery pack. However, the metallic compression limiters are necessarily machined separately from the repeating frame assemblies. A high degree of cleanliness is desirable for the battery pack, and the machined metallic compression limiters can undesirably introduce debris such as metallic flakes into the battery pack during the insertion process. The metallic compression limiters can also oxidize over time, and further contaminate the battery pack. The use of the heat insertion equipment for installation of the metallic compression limiters also adds to a complexity of the battery pack assembly.

There is a continuing need for a prismatic repeating frame assembly for a battery pack that facilitates a compression of the battery pack while maintaining a structural integrity of the repeating frame assembly.

SUMMARY OF THE INVENTION

In concordance with the instant disclosure, a prismatic repeating frame assembly for a battery pack that facilitates a compression of the battery pack while maintaining a structural integrity of the repeating frame assembly, is surprisingly discovered.

The repeating frame assembly of the present disclosure includes a main body formed from a base polymer. The properties of the base polymer are such that the loads required for assembly and function of the battery pack are not design capable. The repeating frame assembly further includes a compression limiter that is formed from an engineered polymer that is resistant to the loads and forces exerted by the assembly process, as well as the frequency inputs from a vehicle in operation, creep, and thermal expansion. The base polymer acts as structural support for the engineered polymer, and the engineered polymer acts as an anti-compressive element of the repeating frame assembly.

The compression limiter sits axially along the path of the insertion bolts or compression rods. The compression limiter may be co-injected along with the base polymer. The co-injection process has certain benefits, including: 1) process improvement by elimination of a heat insertion process typically performed with metallic compression limiters; 2) eliminated requirements for heat installation equipment; 3) increased cleanliness by removal of debris and contamination typically associated with metallic compression limiters limiter both polymeric; 4) improved cycle time for production of the repeating frame assembly; and 5) improved environmental benefits by lead removal.

In a first embodiment, a prismatic repeating frame assembly for a battery pack includes a main body formed from a first polymer. The main body has an aperture formed therein. A hollow compression limiter is formed from a second polymer. The compression limiter is disposed in the aperture of the main body and permits a compression rod to be disposed therethrough. The second polymer is configured to withstand forces during an assembly of the battery pack and frequency inputs during an operation of the battery pack.

In another embodiment, a battery pack includes a plurality of prismatic battery cells, a plurality of cooling elements, a plurality of compression rods, and a prismatic repeating frame assembly as described hereinabove. The battery cells are configured to generate an electrical current from an electrochemical reaction. One of the cooling elements is disposed adjacent to each of the battery cells. The cooling elements are configured to maintain the battery cells within a desired temperature range. The plurality of compression rods is configured to compress the battery cells and the cooling elements. One of the compression rods is disposed through the compression limiter and applies a compressive load to the battery pack.

In a further embodiment, a method for manufacturing a prismatic repeating frame assembly for a battery pack includes the steps of: providing a hollow compression limiter formed from a second polymer, the second polymer configured to withstand forces during an assembly of the battery pack and frequency inputs during an operation of the battery pack; forming a main body from a first polymer around the hollow compression limiter, the compression limiter disposed in an aperture of the main body.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
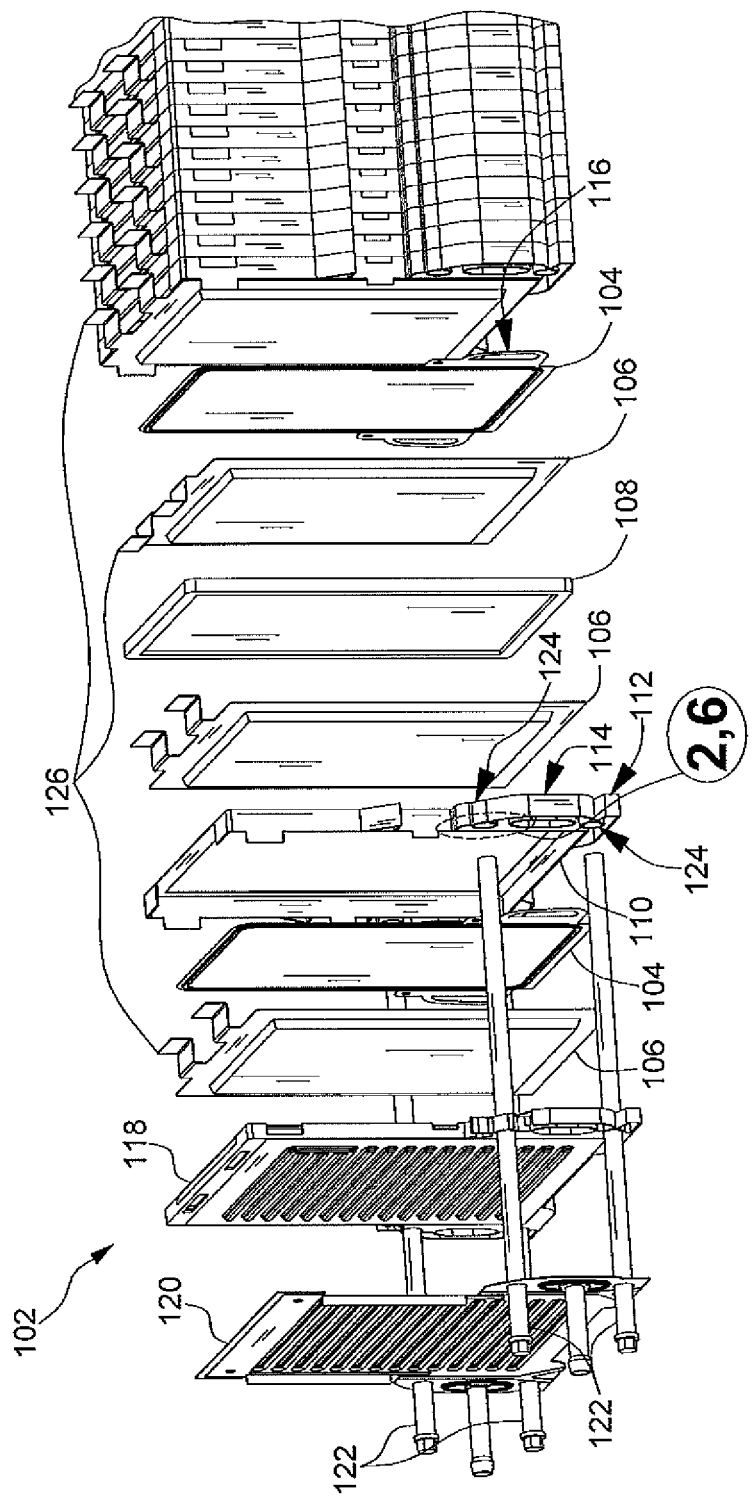
FIG. 1 is an exploded, fragmentary perspective view of a battery pack having a prismatic repeating frame according to the present disclosure.
Figure 2:
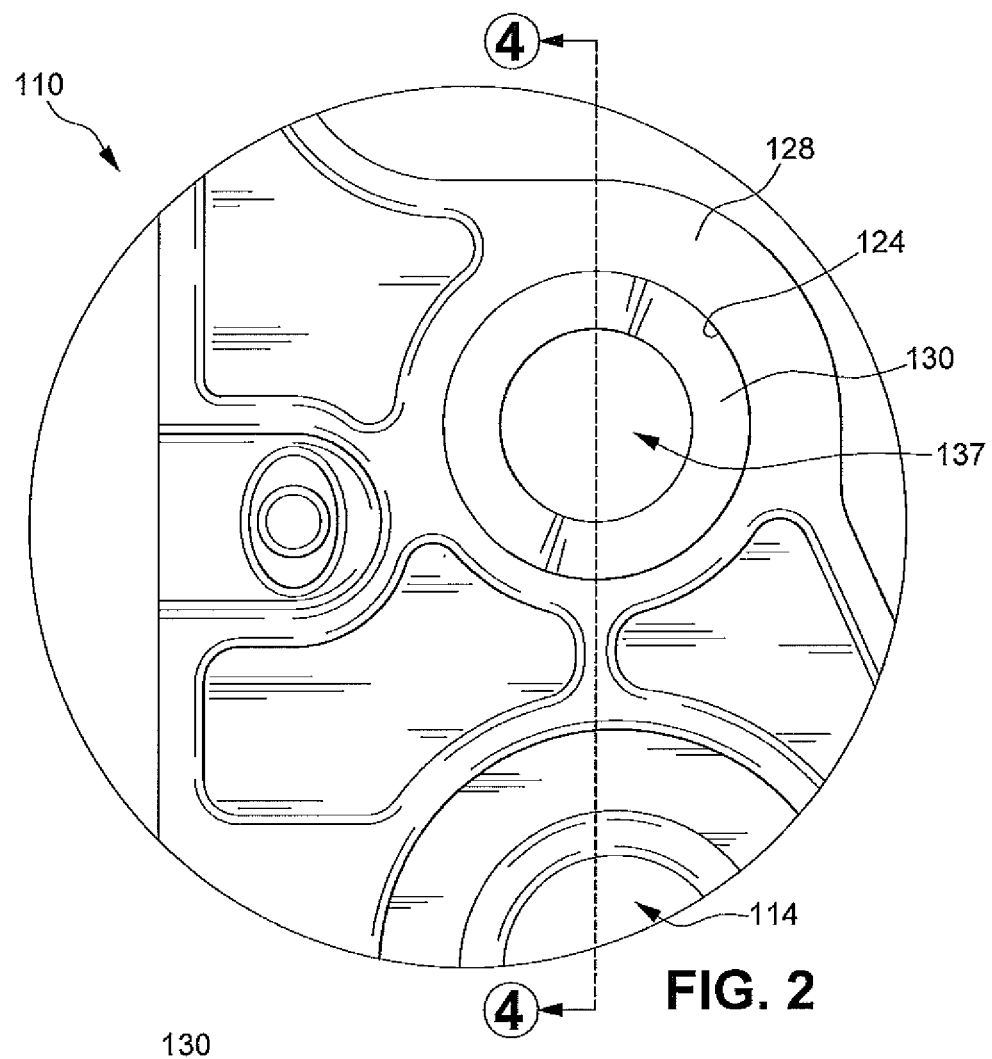
FIG. 2 is an enlarged fragmentary plan view of the prismatic repeating frame shown in FIG. 1 indicated by circle 2, according to one embodiment of the present disclosure.

Referring now to FIG. 1, an exemplary battery pack 102 according to the present disclosure is shown. The assembled battery pack 102 includes a plurality of cooling elements 104 and a plurality of battery cells 106 disposed in a stack. The cooling elements 104 are disposed in the battery pack 102 under compression and in heat transfer communication with the battery cells 106. The cooling elements 104 are configured to maintain the battery cells within a desired temperature range.

The at least one battery cell 106 is a prismatic battery cell configured to generate an electrical current due to an electrochemical reaction in the battery cell. As a nonlimiting example, the at least one battery cell 106 may be a prismatic lithium ion (Li-ion) battery cell. It should be appreciated that other battery cells 106, employing a different structure and electrochemistry, may also be used within the scope of the present invention.

The battery pack 102 may further include a compliant or deformable spacer 108 disposed between a first one of the battery cells 106 and a second one of the battery cells 106. The spacer 108 may be conductive or nonconductive, as desired. As an illustrative example, the spacer 108 may be formed from nonconductive foam that deforms with compression of the battery pack 102. The spacer 108 militates against an undesirable movement of the battery cells 106 during operation of the battery pack 102. Other compliant or deformable materials may also be employed for the spacer 108, as desired.

As shown in FIG. 1, the first one of the battery cells 106, the spacer 108, and the second one of the battery cells 106 are sandwiched between a first one of the cooling elements 104 and a second one of the cooling elements 104. The first cooling element 104 contacts the first battery cell 106, and the second cooling element 104 contacts the second battery cell 106. It should be understood that the first cooling element 104, the first battery cell 106, the spacer 108, and the second battery cell 106 are thereby arranged to form a repeating unit of the battery pack 102.

The repeating unit including the first one of the cooling elements 104, the first one of the battery cells 106, the spacer 108, and the second one of the battery cells 106 is disposed within a prismatic repeating frame assembly 110. The repeating frame assembly 110 may be one of a plurality of repeating frame assemblies 110 in the stack. The repeating frame assemblies 110 are configured to securely hold and align the plurality of battery cells 106 and the plurality of cooling elements 104 in the stack to form the battery pack 102.

In a particular embodiment, the repeating frame assembly 110 includes a pair of outwardly extending ears 112. The outwardly extending ears 112 are disposed on opposite sides of the repeating frame assembly 110. A manifold aperture 114 is formed in each of the outwardly extending ears 112. The manifold apertures 114 of the repeating frame assembly 110 cooperate with manifold apertures 116 of the cooling elements 104 to define the supply and exhaust manifolds for the bulk transport of a coolant fluid to and from the cooling elements 104 of the battery pack 102. It should be appreciated that the manifold apertures 114 of the repeating frame assembly 110 may be formed elsewhere in the body of the repeating frame assembly 110 absent the employment of the outwardly extending ears 112, as desired.

The battery pack 102 according to the present disclosure may further include module end frames 118 and section end assemblies 120 disposed at ends of the stack. The module end frames 118 and the section end assemblies 120 cooperate with compression rods 122 to hold the cooling elements 104 and the battery cells 106 under compression in the repeating frame assemblies 110. The compression rods 122 are disposed through apertures 124 formed in the repeating frame assemblies 110. Like the manifold apertures 114, the apertures 124 for the compression rods 122 may be formed in the outwardly extending ears 112 or elsewhere in the body of the repeating frame assembly 110, as desired.

Section retention loops (not shown) disposed around the stack and section covers (not shown) disposed on sides of the stack may also be employed to hold together the battery pack 102. Electrical tabs 126 in electrical communication with the battery cells 106 are also present for connecting the battery cells 106, for example, in parallel with an interconnect board (not shown). The battery pack 102 suitable for a desired application such as powering an electric vehicle may thereby be provided.

With reference to FIGS. 2-5, the repeating frame assembly 110 according to one embodiment of the disclosure is shown. The repeating frame assembly 110 includes a main body 128 formed from a first polymer. The main body 128 has one of the apertures 124 formed therein. The repeating frame assembly 110 also includes a hollow compression limiter 130. The compression limiter 130 is formed from a second polymer that is different from the first polymer. The first and second polymers may be formed into the main body 128 and the compression limiter 130, respectively, by techniques known in the art including molding processes such as injection molding. Other techniques for forming the main body 128 and the compression limiter 130 from the first and second polymers may also be employed, as desired.

It should be understood that the compression limiter 130 is disposed in the aperture 124 of the main body 128 and permits the compression rod 122 to be inserted therethrough. The second polymer exhibits a greater compression resistance than the first polymer. The second polymer is configured to withstand forces during an assembly of the battery pack 102 and frequency inputs during an operation of the battery pack 102 that are imparted by the compression rods 122, which forces would not otherwise be withstood by the first polymer forming the main body 128. The second polymer has a greater resilience to the assembly forces and the frequency inputs than the first polymer. The main body 128, formed from the first polymer, would exhibit undesirable at least one of deformation and/or degradation if exposed to the assembly forces and the frequency inputs without the presence of the compression limiter 130, formed from the second polymer.

In further embodiments, the compression limiter 130 can withstand loads of at least 10,000 N without significant deformation or degradation. In addition the compression limiter 130 design may include molded anti-rotational features which provide torsional resistance, as well as axial resistance, to the compression limiter 130. For example, the compression limiter 130 of the present disclosure includes at least one outwardly extending protuberance 132 formed on an outer surface 134 of the compression limiter 130. An inner surface 135 of the compression limiter 130 defines a hole 137 through which the compression rod 122 of the battery pack 102 is inserted during assembly of the battery pack 102. The outwardly extending protuberance 132 militates against a relative movement between the compression limiter 130 and the main body 128. In particular, the outwardly extending protuberance 132 militates against a push-out of the compression limiter 130 from the aperture 124 of the main body 128.

As a nonlimiting example, the outwardly extending protuberance 132 may prevent a push-out of the compression limiter 130 from the aperture 124 at up to at least 10,000 N of force applied to the compression limiter 130. In certain embodiments, the outwardly extending protuberance 132 may also militate against a rotation of the compression limiter 130 within the aperture 124 of the main body 128.

Figure 3:
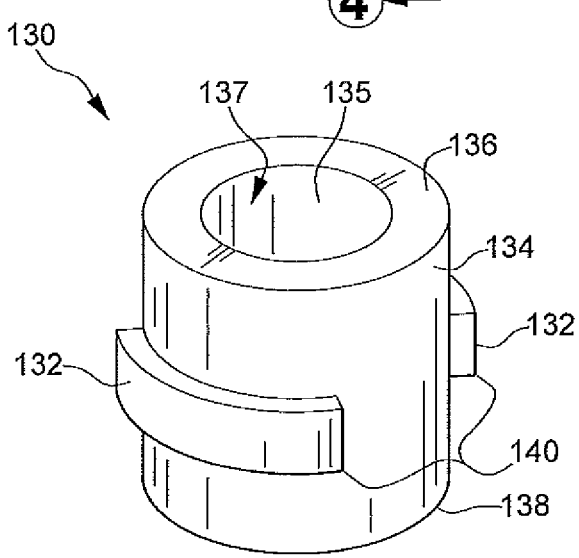
FIG. 3 is a side perspective view of a compression limiter of the prismatic repeating frame shown in FIG. 2.
Figure 4:
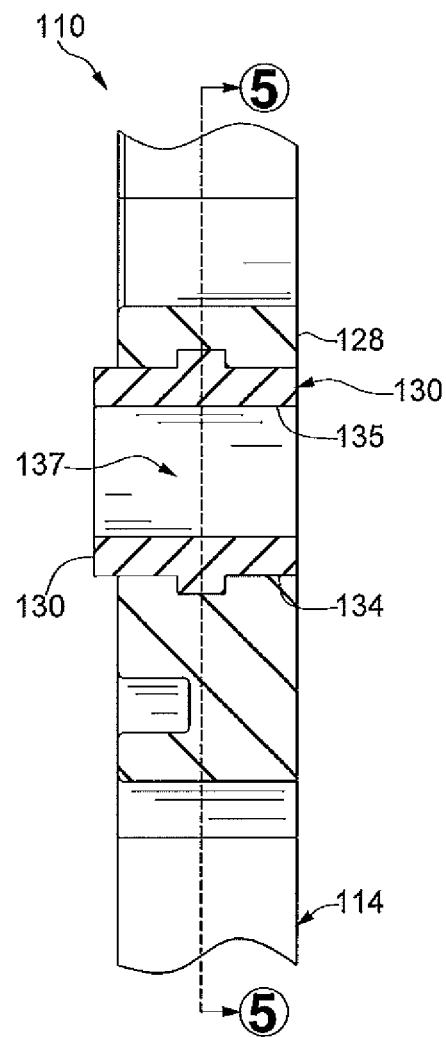
FIG. 4 is a side cross sectional view of the prismatic repeating frame taken along section line 4-4 in FIG. 2.
Figure 5:
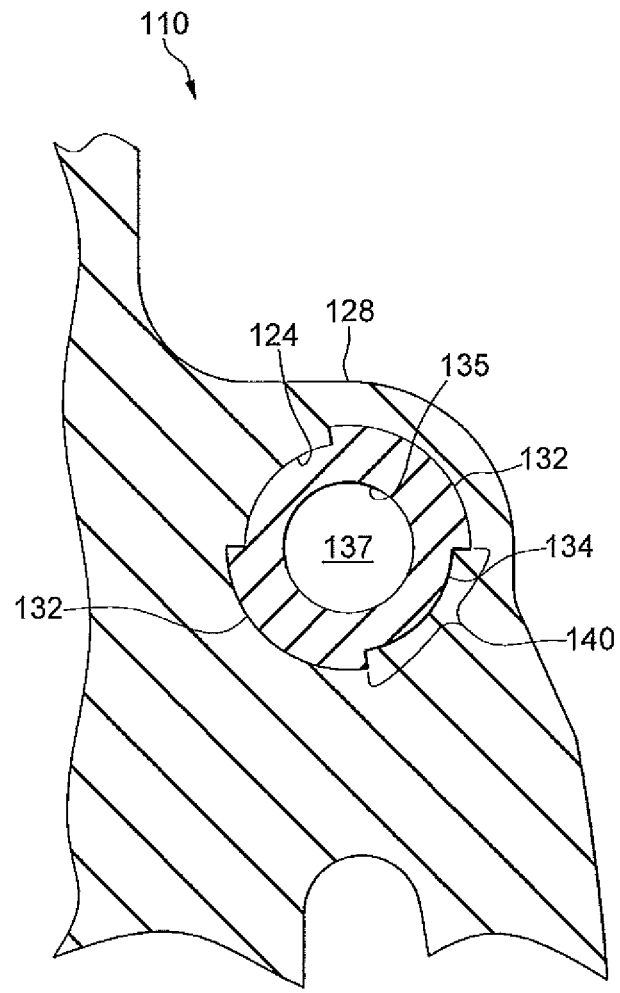
FIG. 5 is a side cross sectional view of the prismatic repeating frame taken along section line 5-5 in FIG. 4.

As shown in FIGS. 3-5, the outwardly extending protuberance 132 may be formed between an upper surface 136 and a lower surface 138 of the compression limiter 130. For example, the outwardly extending protuberance 132 may be substantially centered on the outer surface 134 between the upper surface 136 and the lower surface 138 of the compression limiter 130. The outwardly extending protuberance 132 may also substantially circumscribe the compression limiter 130. Where it is desired that the compression limiter 130 be anti-rotational, the outwardly extending protuberance 132 may include at least one interruption 140. It should be appreciated that the interrupted outwardly extending protuberance 132 cooperates with the surrounding main body 128 to militate against the rotation of the compression limiter 130 within the aperture 124.

Figure 6:
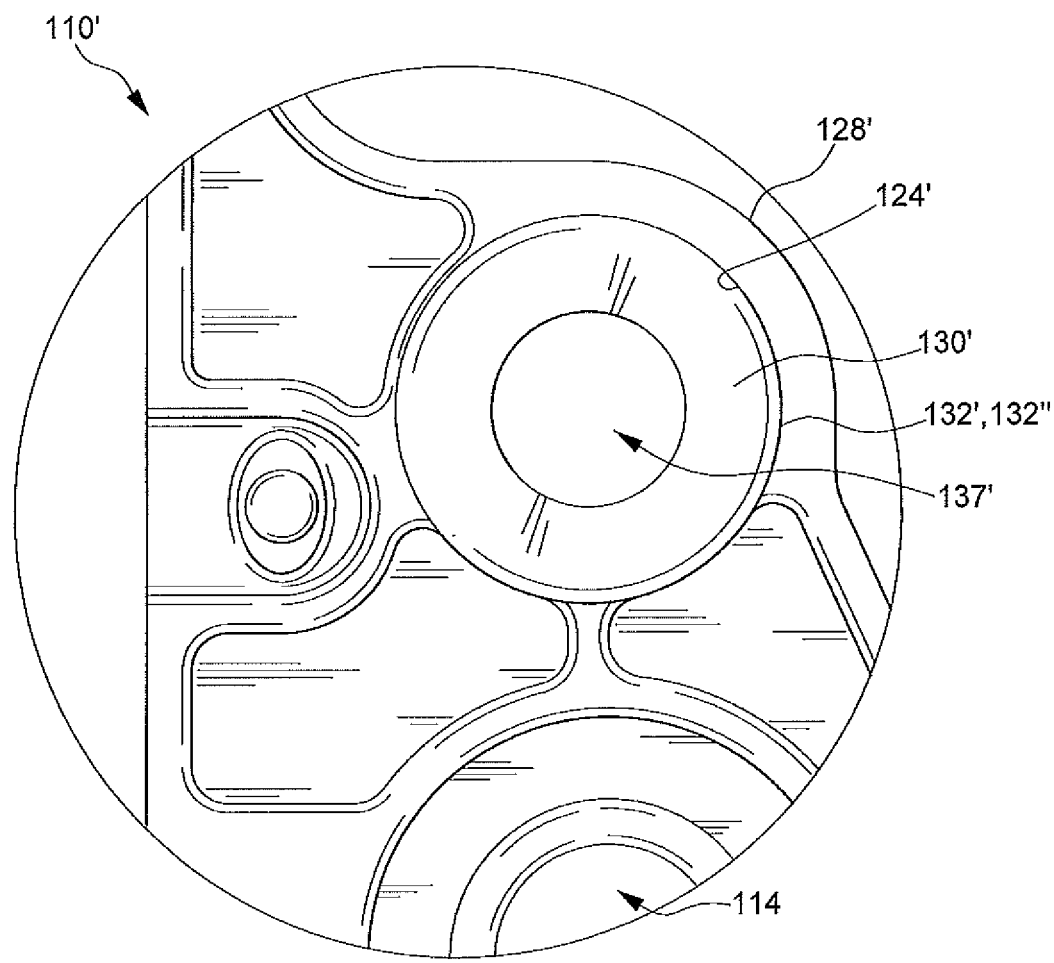
FIG. 6 is an enlarged fragmentary plan view of the prismatic repeating frame shown in FIG. 1 indicated by circle 6, according to another embodiment of the present disclosure.
Figure 7:
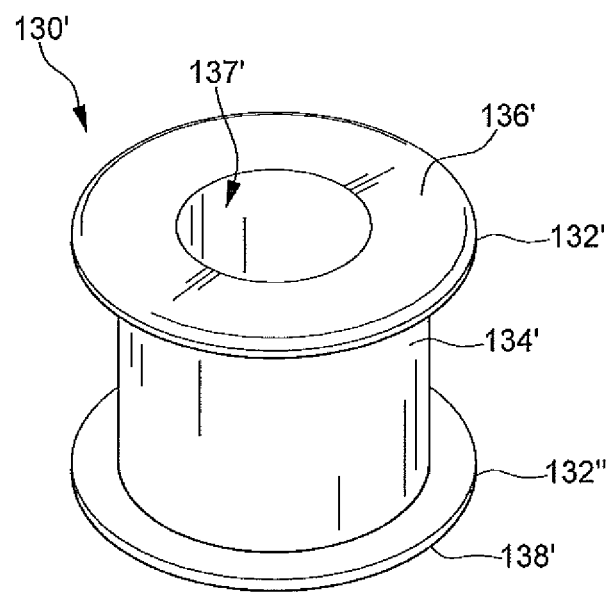
FIG. 7 is a side perspective view of a compression limiter of the prismatic repeating frame shown in FIG. 6.

With reference to FIGS. 6-7, the compression limiter 130' according to another embodiment of the disclosure is shown. Like or related structure from FIGS. 1-5 shown in FIGS. 6-7 is identified by the same reference numeral with a prime (') or a double-prime (") symbol for purpose of clarity. The outwardly extending protuberance 132' is formed adjacent one of the upper surface 136' and the lower surface 138' of the compression limiter 130'. Particularly, a first outwardly extending protuberance 132' is formed adjacent the upper surface 136' of the compression limiter 130', and a second outwardly extending protuberance 132" is formed adjacent the lower surface 138' of the compression limiter 130'. The first outwardly extending protuberance 132' and the second outwardly extending protuberance 132" sandwich the main body 128 therebetween to militate against a push-out of the compression limiter 130' from the aperture 124' of the main body 128'. One of ordinary skill in the art should appreciate that other shapes and configurations for the outwardly extending protuberances 132, 132', 132", suitable to militate against at least one of the push-out and the rotation of the compression limiter 130, 130', are also within the scope of the present disclosure.

The prismatic repeating frame assembly 110, 110' of the present disclosure includes the main body 128, 128' that is formed from the first polymer, which is different from the second polymer of the compression limiter 130, 130'. The first polymer acts as a surrounding structural support for the second polymer that acts as an anti-compressive element of the repeating frame assembly 110, 110'. The second polymer maintains a structural integrity under loads and forces typically associated with compression of the battery pack 102.

A skilled artisan should understand that, because the bulk of the mass of the repeating frame assembly 110, 110' is the first polymer, it is advantageous to employ a class of polymer that may not be sufficient by itself to withstand the forces during the assembly of the battery pack 102 and the frequency inputs during the operation of the battery pack 102. As non-limiting examples, the first polymer may be one of a nylon and a polypropylene. The second polymer forming the compression limiter 130, 130' is instead selected from a class of polymer that is typically sufficient by itself to withstand forces during an assembly of the battery pack 102 and frequency inputs during an operation of the battery pack 102. The second polymer is resistant to the loads and forces exerted on the second polymer by the compression rods 122 during the assembly process. The frequency input to which the second polymer is resistant can include inputs from the vehicle in which the battery pack 102 is employed as a power source, as well as creep and thermal expansion inputs. As nonlimiting examples, the second polymer may be an engineered polymer such as one of a polyphenylene sulfide (PPS) and a polyether ether ketone (PEEK).

Where PPS is used as the second polymer, and nylon is used as the first polymer, there may also be a chemical bond between the PPS compression limiter 130, 130' and the polyamide main body 128, 128'. Sulfur in the backbone of the PPS also provides desirable properties to the repeating frame assembly 110, 110' including low creep, service temperatures of up to at least 240° C., and a desirably high rigidity. Similar bonds may be used with other materials as well.

The second polymer may also be compounded, for example, with one of a glass filler and a carbon filler to reinforce and impart a greater dimensional stability to the compression limiter 130, 130'. Suitable carbon fillers may include graphite fillers, for example. In any case, the compression limiter 130, 130' is not formed from a metal. Other polymers and compound formulations for the first polymer and the second polymer of the repeating frame assembly 110, 110' may be also be selected, as desired.

In certain embodiments, the second polymer forming the compression limiter 130, 130' may be selected to have a compressive yield strength at least fifty percent (50%) greater than a compressive yield strength of the first polymer forming the main body 128, 128'. As a nonlimiting example, the second polymer has a compressive yield strength of greater than about 150 MPa where the first polymer has a compressive yield strength of about 100 MPa. A skilled artisan may select other first and second polymers with different relative compressive yield strengths within the scope of the present disclosure.

It should be understood that the compression limiter 130, 130' of the present disclosure is also bonded to the main body 128, 128' of the repeating frame assembly 110, 110'. The bonding is provided by a intermingling of the first polymer and the second polymer at an interface between the compression limiter 130, 130' and the main body 128, 128'. For example, where the first polymer and the second polymer are thermoplastics co-injected at substantially the same time, the first polymer and the second polymer in the fluid or semi-fluid state will intermingle at the interfaces between the same. The intermingling results in the microstructural bonding of the main body 128, 128' with the compression limiter 130, 130' that cooperates with the mechanical resistance provided by the outwardly extending protuberance 132, 132', 132" to militate against a push-out and a rotation of the compression limiter 130, 130'.

In another example, where the compression limiter 130, 130' is either injected before, or provided as a pre-formed solid of the second polymer, the first polymer in the fluid state may be injected around the second polymer. Regardless of the solid state of the second polymer, the second polymer at the interface will interact with the first polymer fluid and result in the bonding between the main body 128, 128' and the compression limiter 130, 130'. Additionally, the first polymer may be selected to exhibit a volumetric shrinkage different from a volumetric shrinkage of the second polymer as the first polymer cools and solidifies around the second polymer. As one nonlimiting example, the first polymer may be a nylon that exhibits a volumetric shrinkage of approximately forty microns (40 μm) as the nylon cools to room temperature following molding. The volumetric shrinkage of the first polymer around the second polymer tightly secures the compression limiter 130, 130' within the main body 128, 128', and thereby further militates against a push-out and a rotation of the compression limiter 130, 130'.

The present disclosure also includes a method for manufacturing the prismatic repeating frame assembly 110, 110' for the battery pack 102. The method first includes the step of providing the hollow compression limiter 130, 130' formed from the second polymer. The main body 128, 128' of the repeating frame assembly 110, 110' is formed from a first polymer around the compression limiter 130, 130'. The compression limiter 130, 130' is disposed in the aperture 124, 124'formed in the main body 128, 128'. The prismatic repeating frame assembly 110, 110' is thereby formed.

The step of providing the compression limiter 130, 130' may further includes the steps of molding the compression limiter 130, 130' at a first temperature, and forming the at least one outwardly extending protuberance 132, 132' on the outer surface 134, 134' of the compression limiter 130, 130'. The at least one outwardly extending protuberance 132, 132' may be formed by the insertion of slides into a mold in which the compression limiter 130, 130' is formed, for example. Other means for forming the at least one outwardly extending protuberance 132, 132' may also be used, as desired.

The step of forming the main body 128, 128' around the hollow compression limiter 130, 130' may also include the step of molding the main body 128, 128' around the compression limiter 130, 130' at a second temperature. The second temperature is lower than the first temperature. The second temperature may be sufficient to melt the first polymer forming the main body 128, 128', and insufficient to melt the second polymer forming the compression limiter 130, 130'. It should be appreciated that the first and second temperatures are dependent upon the melting temperatures of the first and second polymers, and may be selected by a skilled artisan as desired.

In a particular embodiment, the second polymer forming the compression limiter 130, 130' is co-injected with the first polymer forming the main body 128, 128', wherein an intermingling of the first polymer and the second polymer may occur at the interface between the main body 128, 128' and the compression limiter 130, 130'. The intermingling of the first polymer and the second polymer at the interface between the same advantageously results in a bonding of the main body 128, 128' to the compression limiter 130, 130' as described hereinabove.

Advantageously, the prismatic repeating frame assembly 110, 110' of the present disclosure does not employ metal in the compression limiter 130, 130'. The use of the second polymer instead of metal minimizes a complexity of assembling the repeating frame assembly 110, 110' because a different process such as heat insertion for installing the compression limiter 130, 130' is not required. Equipment needed for the heat installation process is no longer needed. In addition, the employment of the polymeric compression limiter 130, 130' beneficially permits the manufacturer to meet the stringent cleanliness requirements associated with battery pack 102 production. The removal of machined metal from the compression limiter 130, 130' design also minimizes an opportunity for debris such as metal flakes associated with the machined metal limiters to contaminate the battery pack 102.

Cycle times associated with the production of the battery pack 102 are also greatly reduced with the repeating frame assembly 110, 110'. Additionally, a mass reduction benefit is realized due to the employment of less massive polymers instead of metal for the compression limiter 130, 130'. Environmental benefits are also realized by not using leaded brass material in the compression limiter 130, 130' of the present disclosure. The present disclosure also allows for an exchange of second polymers for the compression limiter 130, 130' to account for varying conditions (e.g., from PPS to PEEK) where a greater compression yield is desired.

One of ordinary skill in the art should understand the importance of maintaining tight dimensional tolerances for the compression limiter 130, 130'. If the compression limiter 130, 130' has greater than desired dimensions, the compression limiter 130, 130' will undesirably result in excessive forces in the battery pack 102. If the compression limiter 130, 130' has less than desired dimensions, an unsealing of the battery pack 102 and a leakage of cooling fluid from the battery pack 102 may result. The present disclosure further provides greater dimensional control of the compression limiter 130, 130' because there is no external machining process. A highly repeatable mold may be employed to form the compression limiter 130, 130', and thereby minimize an opportunity for undesirable forces or leakage of coolant fluid in the assembled battery pack 102.

While certain representative embodiments and details have been shown for purposes of illustrating the invention, it will be apparent to those skilled in the art that various changes may be made without departing from the scope of the disclosure, which is further described in the following appended claims.

What is claimed is:

1. A prismatic repeating frame assembly for a battery pack, comprising:
   a main body formed from a first polymer, the main body having an aperture formed therein; and
   a hollow compression limiter formed from a second polymer, the compression limiter having an upper surface, the compression limiter disposed in the aperture of the main body such that the upper surface of the compression limiter is positioned within the aperture of the main body, the compression limiter permitting a compression rod to be inserted therethrough, wherein the compression limiter is bonded to the main body by an intermingling of the first polymer and the second polymer at an interface between the compression limiter and the main body.

2. The prismatic repeating frame assembly of claim 1, wherein the main body includes at least an ear formed on one side of the main body, the aperture formed through the ear of the main body.

3. The prismatic repeating frame assembly of claim 1, wherein the compression limiter includes at least one outwardly extending protuberance formed on an outer surface of the compression limiter, the outwardly extending protuberance militating against a relative movement between the compression limiter and the main body.

4. The prismatic repeating frame assembly of claim 3, wherein the outwardly extending protuberance prevents a push-out of the compression limiter from the aperture up to at least 10,000 N of force applied to the compression limiter.

5. The prismatic repeating frame assembly of claim 3, wherein the outwardly extending protuberance is formed between an upper surface and a lower surface of the compression limiter.

6. The prismatic repeating frame assembly of claim 5, wherein the outwardly extending protuberance substantially circumscribes the compression limiter.

7. The prismatic repeating frame assembly of claim 3, wherein the outwardly extending protuberance includes at least one interruption.

8. The prismatic repeating frame assembly of claim 3, wherein the outwardly extending protuberance is formed adjacent at least one of an upper surface and a lower surface of the compression limiter.

9. The prismatic repeating frame assembly of claim 8, wherein a first outwardly extending protuberance is formed adjacent the upper surface of the compression limiter, and a second outwardly extending protuberance is formed adjacent the lower surface of the compression limiter, the first outwardly extending protuberance and the second outwardly extending protuberance sandwiching the main body therebetween to militate against a push-out of the compression limiter from the aperture.

10. The prismatic repeating frame assembly of claim 1, wherein the second polymer has a compressive yield strength at least fifty percent (50%) greater than a compressive yield strength of the first polymer.

11. The prismatic repeating frame assembly of claim 10, wherein the second polymer has a compressive yield strength of greater than about 150 MPa.

12. The prismatic repeating frame assembly of claim 1, wherein the first polymer is one of a nylon and a polypropylene.

13. The prismatic repeating frame assembly of claim 1, wherein the second polymer is one of a polyphenylene sulfide (PPS) and a polyether ether ketone (PEEK).

14. The prismatic repeating frame assembly of claim 1, wherein the second polymer is compounded with one of a glass filler and a carbon filler to reinforce and impart a greater dimensional stability to the compression limiter.

15. The prismatic repeating frame assembly of claim 1, wherein the intermingling of the first polymer and the second polymer is the result of co-injecting the main body and the compression limiter to form the prismatic repeating frame assembly.

16. A battery pack, comprising:
a plurality of prismatic battery cells configured to generate an electrical current from an electrochemical reaction;
a plurality of cooling elements, one of the cooling elements disposed adjacent each of the battery cells and configured to maintain the battery cells within a desired temperature range;
a plurality of compression rods configured to align and compress the battery cells and the cooling elements; and
a prismatic repeating frame assembly in which at least one of the prismatic battery cells and at least one of the cooling elements are disposed, the repeating frame assembly including a main body formed from a first polymer, the main body having an aperture formed therein, a hollow compression limiter formed from a second polymer, the compression limiter having an upper surface, the compression limiter inserted in the aperture of the main body such that the upper surface of the compression limiter is positioned within the aperture of the main body, the compression limiter bonded to the main body by an intermingling of the first polymer and the second polymer at an interface between the compression limiter and the main body, and one of the compression rods disposed through the compression limiter and applying a compressive load to the battery pack.

* * * * *